United States Patent [19]

Buzzoni et al.

[11] Patent Number: 5,234,653
[45] Date of Patent: Aug. 10, 1993

[54] METHOD FOR SLUSH MOULDING ARTICLES OF TWO OR MORE COLORS FROM THERMOPLASTIC, THERMOSETTING OR ELASTOMERIC RESINS IN POWDER FORM

[75] Inventors: Giancarlo Buzzoni; Paolo Cittadini, both of Varese, Italy

[73] Assignee: Industrie ILPEA S.p.A., Malgesso, Italy

[21] Appl. No.: 758,106

[22] Filed: Sep. 12, 1991

[30] Foreign Application Priority Data

Sep. 17, 1990 [IT] Italy .................. 21488 A/90

[51] Int. Cl.⁵ .................. B29C 33/40; B29C 39/12; B29C 41/18
[52] U.S. Cl. .................. 264/219; 264/245; 264/246; 264/255; 264/259; 264/301; 264/302; 264/310; 264/314; 264/332; 264/DIG. 57; 264/DIG. 79
[58] Field of Search .................. 264/245–247, 264/248, 259, 266, 255, 301–304, 306, 310, 311, 318, 332, 334, 336, 219, DIG. 57, DIG. 60, DIG. 64, DIG. 79, 313, 314

[56] References Cited

U.S. PATENT DOCUMENTS

| 2,736,925 | 3/1956 | Heisier et al. ............. 18/55 |
| 2,915,788 | 12/1959 | Engel ............. 18/58 |
| 3,004,297 | 10/1961 | Stover ............. 264/163 |
| 3,039,146 | 6/1962 | Engel ............. 18/38 |
| 4,562,025 | 12/1985 | Gray ............. 264/DIG. 60 X |
| 4,610,620 | 9/1986 | Gray ............. 425/434 |
| 4,634,360 | 1/1987 | Gray ............. 425/130 |
| 4,643,863 | 2/1987 | Martini ............. 264/275 X |
| 4,683,098 | 7/1987 | Belleville et al. ............. 264/302 |
| 4,716,003 | 12/1987 | Gandreau ............. 264/302 |
| 4,755,339 | 7/1988 | Reilly et al. ............. 264/275 X |
| 4,790,510 | 12/1988 | Takamatsu et al. ............. 264/302 X |
| 4,792,425 | 12/1988 | Weaver ............. 264/328.8 X |
| 4,822,438 | 4/1989 | Williams, Jr. et al. ............. 264/303 X |
| 4,882,173 | 11/1989 | LaRoche et al. ............. 264/245 X |
| 4,925,151 | 5/1990 | Gray ............. 264/245 X |
| 4,999,147 | 3/1991 | Kojima et al. ............. 264/252 X |
| 5,033,954 | 7/1991 | Kargarzadeh ............. 264/245 X |
| 5,046,941 | 9/1991 | Batchelder et al. ............. 264/245 X |

FOREIGN PATENT DOCUMENTS

| 0159309 | 9/1984 | Japan ............. 264/245 |
| 01468 | 4/1985 | PCT Int'l Appl. ............. 264/252 |

Primary Examiner—Karen Aftergut
Attorney, Agent, or Firm—Foley & Lardner

[57] ABSTRACT

A method for moulding a two-colored material includes moulding a gasket such that it has a profile which is approximately the same as a profile of one of a plurality of possible corresponding regions of the inner surface of a mould. In addition, a rigid material is embedded in the gasket and the gasket is fixed to a separation wall. The gasket and the separation wall are then inserted into the mould with the gasket being aligned along the one of the plurality of possible corresponding regions of the inner surface of the mould, such that a seal between the inner surface of the mould and the separation wall is formed and first and second half-spaces are defined within the mould. The gasket is compressed against the inner surface of the mould to improve the sealing therewith and slush moulding of a layer of a first colored material within the first half-space is performed. The layer of the first colored material is consolidated and the gasket and the separation wall are removed from the mould. Slush molding of a continuous layer of a second colored material within the mould is then performed, thereby producing a moulded two-colored article which includes the layer of the first colored material and the continuous layer of the colored material as well as a separation line between the respective colored sections.

4 Claims, 3 Drawing Sheets

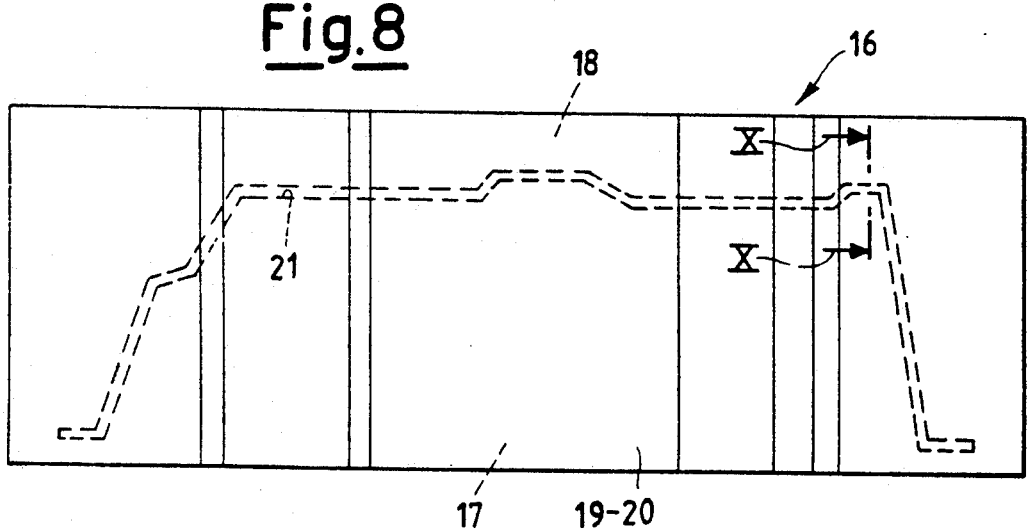
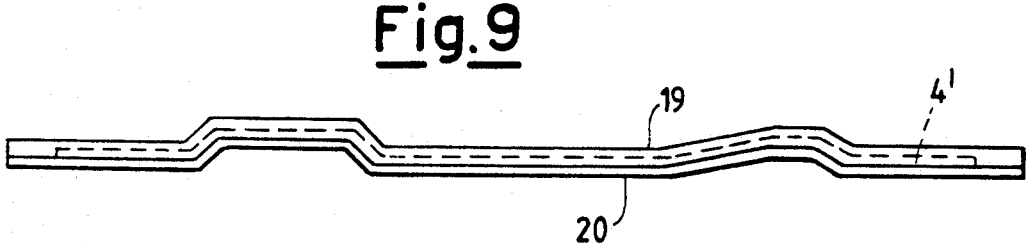
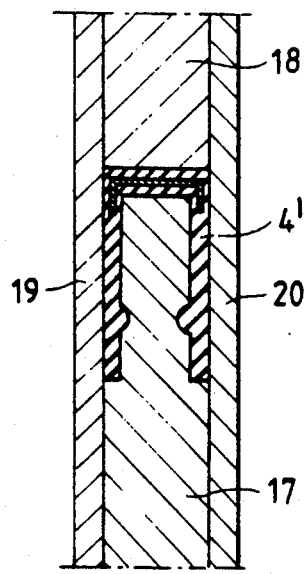 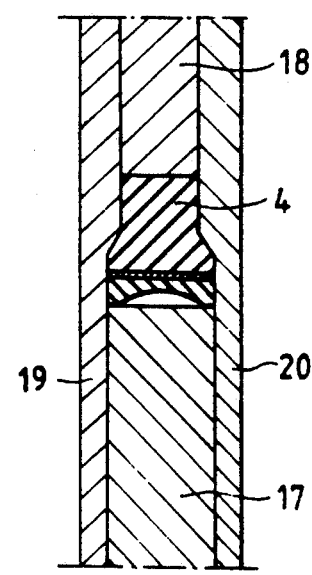

METHOD FOR SLUSH MOULDING ARTICLES OF TWO OR MORE COLORS FROM THERMOPLASTIC, THERMOSETTING OR ELASTOMERIC RESINS IN POWDER FORM

BACKGROUND OF THE INVENTION

The method of slush moulding plastisol or PVC powder or other materials is generally known and is described in the literature, of which the following examples can be cited:
1) "PLAST"—September 1979 pp 175–177.
2) "MODERN PLASTIC ENCYCLOPEDIA" 1977-1978 pp 340 onwards.
3) BALL W., Ziebart W., Woite B. (BMW) Mannheim VDI conference "New Requirement for Car Interior Trim" pp 1-18.
4) Pabst H. G., Shaper S., Schmidt H., Terveen A. (AUDI) Mannheim VDI Conference 1987—"Development and large-scale sue of dashboards produced by Slush Moulding PVC".
5) Khue N. N., Kunpers-Martz M., Dankmeier O. (EVC) "Development of optimum powder-blend for slush moulding" IVth International Conference PVC '90—Apr. 24-26, 1990, Brighton U.K., pp 31/1-31/14. FR-A-1,439,028 (Rhone Poulenc), CH-A-293,508 (J. Croning), FR-A-1,075,378 (Telegraph Construction), FR-A-1,381,850 (Gosudarstvenny), GB-A-905,546 (Plastomatic) U.S. Pat. No. 2,736,925 (J. S. Heisler), FR-A-1,131,153 (National Research), GB-A-1,337,962 (Aquitaine Total), GB-A-1,056,109 (Celanese), U.S. Pat. No. 3,039,146 (T. Hengel), U.S. Pat. No. 2,915,788 (T. Hengel), GB-A-865,608 (T. Hengel), FA-A-916,055 (ICI), GB-A-1,025,493 (M. F. Smith), FA-A-1,560,675 (Goodyear Tire), DE-A-1,554,967 (Vaessen-Schemaker), IT-A-22197 A/80 (ILPEA), DE-A-3,417,727 (YMOS).

All these patents or articles describe a substantially similar process, briefly consisting of filling a preheated metal mould with polymer liquid or powder, removing the excess liquid or solid and then heating the mould to complete gelling or fusion of the material which has adhered to it. The mould is then cooled and the final moulding extracted.

In the sector involving such articles a problem has recently appeared when trying to obtain a finished product, such as simulated leather for trimming an automobile dashboard, having two or more sharply divided colors in the exposed part of the moulding.

SUMMARY OF THE INVENTION

The object of the present invention is therefore to form articles such as thermoplastic, thermosetting or elastomeric resin based simulated leathers or the like, of the type which are moldable in an open top mould, such that they comprise two or more different colors in their exposed part, i.e. that part which adheres to the inner surface of the mould.

This object is attained according to the invention by a method for slush moulding two-color articles such as simulated leathers or the like from materials chosen from the group of thermoplastic, thermosetting and elastomeric resins in powder form, characterised by comprising the following stages:

a) moulding a gasket which substantially reproduces as such or slightly modified the profile of said mould along that line thereof which defines on the moulded article the corresponding separation line between two different colours, b) providing on the inside of said mould along said separation line at least one dividing wall to thus define two separated half spaces inside said mould, c) fixing said gasket onto said dividing wall in proximity to the mould to hence form a seal within the mould between said two half-spaces, d) slush moulding a layer of a first material constituting the first of said colours, said layer adhering to the mould only on the walls of the first half-space defined within it, e) consolidating the layer of said first material adhering to the mould, f) removing said dividing wall and the relative gasket from the mould, g) slush moulding a continuous layer of a second material constituting the second of said two or more colours, and so on according to the number of colours required. In stage d) of the aforesaid method, the material is left in contact with the mould for the time required for it to adhere and partly gel or melt in the part relating to the first colour. The sealing performed by the gasket if necessary can be improved by suitable means, such as for instance by applying vacuum to the system. The mould is then emptied of the excess (powder) material, the gasket is removed and a further filling of material of the second colour is made within the shortest possible time, the material is left in contact with the hot mould for the required time depending on the thickness to be obtained, and the excess is then removed.

The mould is heated to complete the total gelling or fusion, after which it is suitably cooled and the finished product is extracted from the mould, which can then recommence its production cycle.

BRIEF DESCRIPTION OF THE DRAWINGS

The characteristics and advantages of the present invention will be more apparent from the description of one embodiment thereof given hereinafter with reference to the accompanying drawings.

FIG. 8 shows a form or mould for forming a gasket suitable for the method of the invention.

FIG. 9 shows a detail of FIG. 8.

FIG. 10 is a section on the line X—X of FIG. 8.

FIG. 11 is a view analogous to FIG. 10, showing a further embodiment of the invention.

DESCRIPTION OF THE PREFERRED EMBODIMENT

Figure 1:
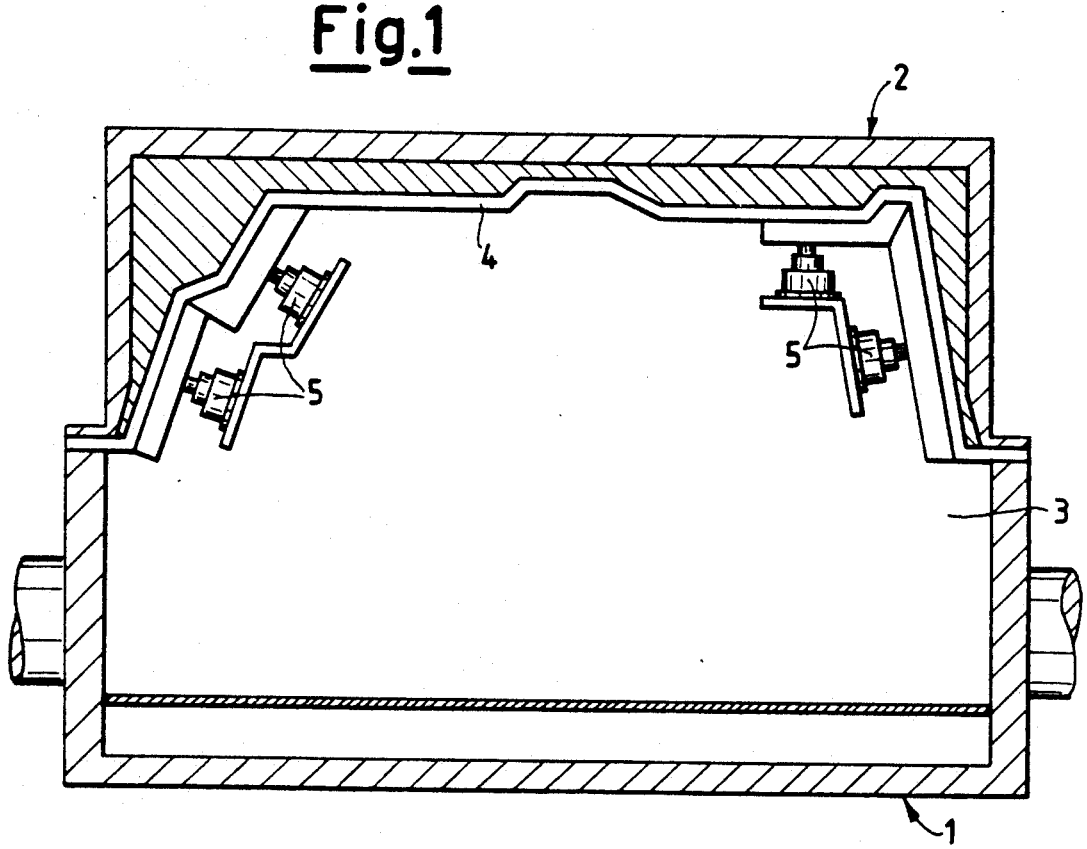
FIG. 1 is a cross-section through a mould of the invention mounted on a slush moulding tank.

In FIG. 1 the reference numeral 1 indicates a slush moulding tank on which a mould 2 is mounted in an operating position.

Figure 4:
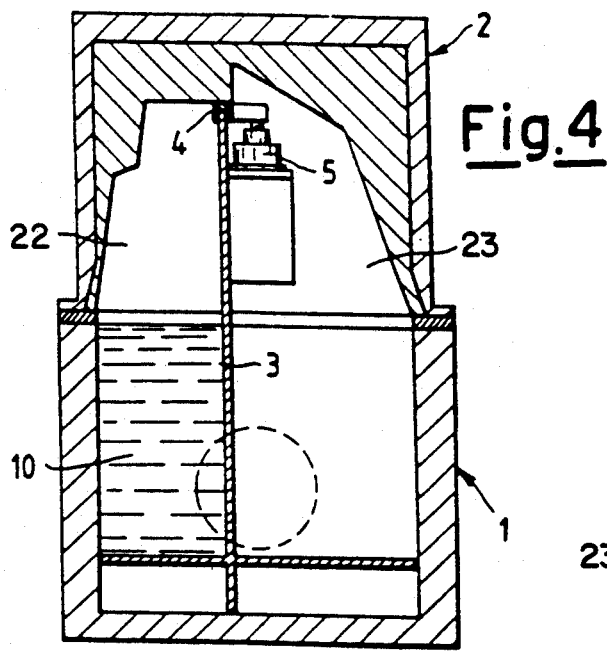
FIGS. 4, 5 and 6 are cross-sectional views showing in succession the stages in the implementation of the method of the present invention.

The tank 1 is divided longitudinally into two parts by a vertical wall 3 which extends into the mould 2 overlying the tank so as to define in the mould 2 two half-spaces indicated by 22 and 23 in FIG. 4.

The upper profile of the all 3, extending into the mould 2, substantially reproduces the shape of that region of the mould within which this wall lies.

Along that perimeter of the dividing wall 3 which cooperates with the mould 2 there is fixed a gasket 4 for forming a seal between the two half-spaces 22 and 23.

Figure 2:
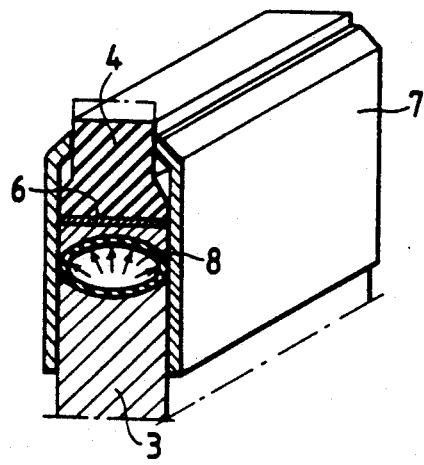
FIG. 2 is a perspective sectional view of a detail of a first embodiment of the gasket mounted on said tank.
Figure 3:
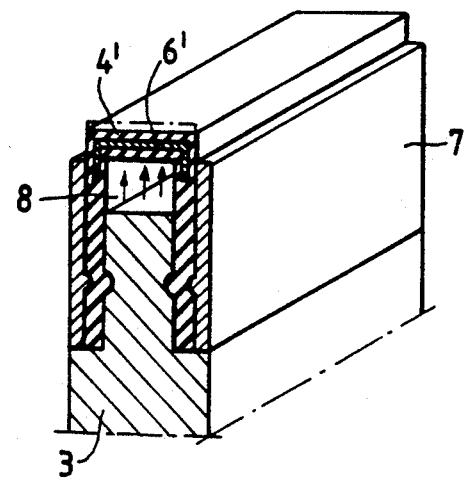
FIG. 3 is a perspective sectional view of a detail of a further embodiment of the gasket of the invention mounted on said tank.

This gasket can be of various cross-sections. For example, FIG. 2 shows a gasket 4 of substantially trapezoidal cross-section within which a metal insert 6 is incorporated for stiffening the gasket 4. FIG. 3 shows a modified gasket 4' of substantially C-shaped cross-section within which a stiffening insert 6' is provided. To enable the gasket to be fixed onto the dividing wall 3, a fixing section 7 is provided and is forced over the dividing wall 3 in order to clamp the gasket 4 in place. Various means can be provided to obtain a perfect seal between the gasket 4 and the corresponding mould line against which the gasket is to act. For example, FIG. 1 shows mechanical means 5 mounted on the dividing wall 3 for compressing the gasket 4 against the mould wall. In contrast, the means shown in FIGS. 2 and 3 for compressing the gasket against the mould wall are air chambers 8 into which compressed air is fed via suitable nozzles below the gasket 4 or 4', in order to urge the gasket 4, 4' against the mould wall and hence optimize the seal.

Figure 5:
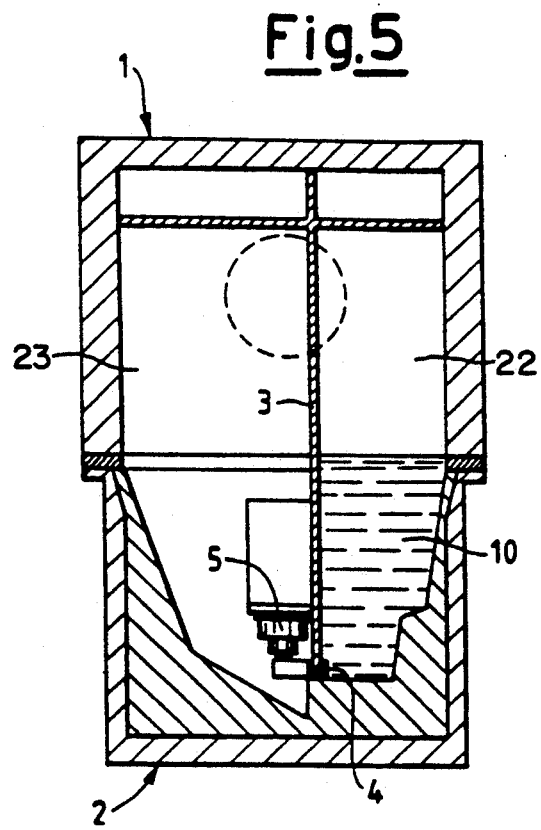
Figure 6:
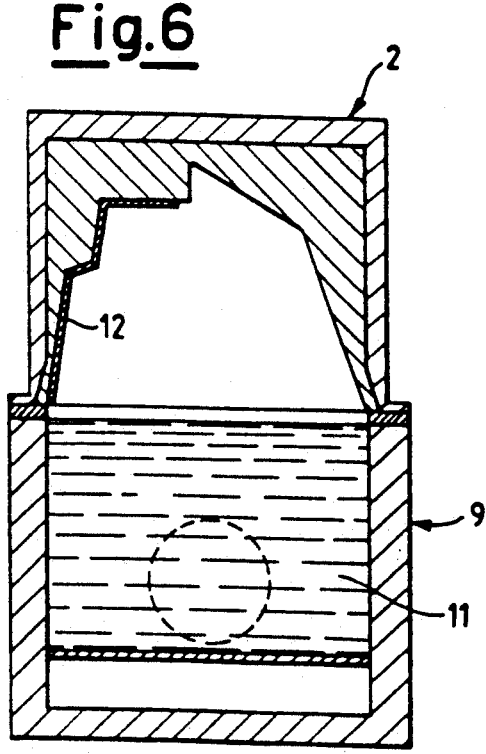

FIGS. 4 and 5 show the operation of the structure of FIG. 1 in two successive positions. In these figures, the longitudinal half of tank 1 corresponding to the half-space 22 of the mould is filled with a first plastic material 10 suitable for slush moulding, the first plastic material constituting the first color of the article. FIG. 6 shows the next operating stage, in which the mould 2 is now mounted on a second tank 9. Tank 9 does not have a dividing wall and is filled with a second plastic material 11 suitable for slush moulding and constituting the second color of the finished article.

Figure 7:
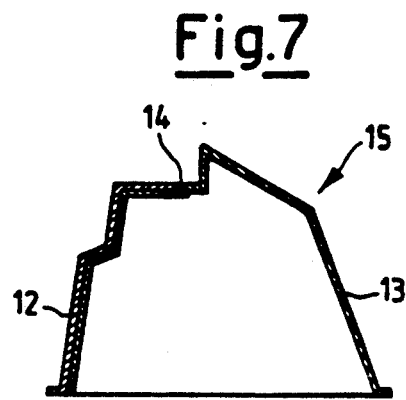
FIG. 7 shows a finished article resulting from the method of the invention, and which has been extracted from the mould.

In FIG. 7 the reference numeral 15 shows the finished article after leaving the mould. The finished article 15 includes a layer 12 consisting of the first color derived from the material 10, and a layer 13 consisting of the second colour and hence deriving from the material 11.

The two layers 12 and 13 are separated from each other along a separation line 14.

FIG. 8 shows a form or mould 16 for forming the gasket according to the method of the invention, in which a space 21 is defined between two paris of half-moulds 17, 18 and 19, 20 which exactly reproduces the profile of the mould 2 of FIG. 1 along the separation line 14 of the finished article 15 is shown in FIG. 7.

FIG. 10 shows the forming of the gasket 4' in the embodiment of FIG. 3, while FIG. 11 shows the forming of the gasket 4 in the embodiment of FIG. 2.

Finally, FIG. 9 is a full view of the gasket 4' as obtained from the forming mould 16, the shape of which exactly reproduces the profile of the forming mould 2 for the finished article.

The operation of the structures shown in the aforedescribed figures is as follows. Having defined the separation line 14 between the two colours in the finished article 15 on the basis of production requirements, this line must be made to correspond in terms of its shape and design exactly to the mould profile in that region in which the gasket is to be mounted. To achieve this, the gasket can either be moulded in a form or mould of the type shown in FIG. 8 in which the forming space 21 corresponds exactly to the profile of the article mould 2 shown in FIG. 1, or be directly formed in the actual mould shown in FIG. 1, in the region in which the separation line between the two different colours is defined. The gasket if necessary can be obtained form forms having different dimensions in comparison with those of the mould 2 since this can prove to be helpful. For instance the dimensions of the form can be slightly enlarged.

The gasket 4 is obtained by moulding liquid silicone rubber in the mould of FIG. 8 or in the mould of FIG. 1.

Before moulding, stiffening inserts of the type 6 or 6' are embedded in it to better distribute the thrust of the gasket against the mould 2 during the operation when the seal is required.

Having prepared the gasked 4 (or 4') it is mounted for operational purposes as shown in FIG. 1, 2 and 3, by either forcing it directly onto the dividing wall 3 or fixing it by a fixing means. The half of the tank 1 corresponding to the half-space 22 is then filled with a first plastic material 10, after which slush moulding is carried out as shown in FIGS. 4 and 5.

In this manner, a first layer 12 is formed of the material 10 constituting the first colour of the finished article. When this first layer 12 has been consolidated, the mould 2 is coupled if required, with the aid of driving means with a second tank 9 as shown in FIG. 6, this time the second tank 9 is completely filled with a plastic material 11 of a different colour from the first. Slush moulding is now carried out with this second material 11. The second material 11 is able to adhere to wall of mould 2 which remains uncovered after deposition of the layer 12 of the first material. When moulding is complete the finished article has the form shown in FIG. 7, and includes a first layer 12 and a second layer 13 separated along the separation line 14. During those stages of the method shown in FIGS. 4 and 5, gasket thrust means such as the pneumatic means shown in FIGS. 2 and 3 or the mechanical means shown in FIGS. 1 and 4, or both types of gasket compressing means, are suitably operated. That is, in FIGS. 2 and 3, compressed air is forced through the chamber 8 and against the gasket 4, such that the gasket is compressed against the mould 2. The sealing performed by the gasket can be further improved by means of suitable devices, such as for instance vacuum means applied to the tank portion containing the plastic material. It should be noted that the aforesaid description with reference to the accompanying drawings in no way limits the scope of the invention, which can undergo numerous modifications with respect to that described and illustrated in the figures. For example, numerous modifications ar possible in the form of the seal gasket according to the present invention and in the manner of fixing the gasket to the dividing wall provided in the mould for forming the article. The method of the invention is suitable for preparing multi-colored articles, in which case those modification necessary to enable successive deposition of a number of layers of different materials of different color have to be made to the described method.

From the aforegoing it is apparent that the method of the invention represents an effective method for moulding articles such as simulated leather products, for example for the automobile industry, with different colored portions. The method of the invention is highly advantageous in its practical implementation and the articles obtained have very high quality characteristics.

We claim:

1. A method for making a moulded two-colored article comprising the steps of:
   a) providing a mould having an inner surface;
   b) moulding a gasket having a profile which is approximately the same as a profile of a corresponding region of the mould inner surface;
   c) embedding a rigid material in the gasket;
   d) fixing the gasket to a separation wall having a chamber therein;
   e) inserting the gasket and the separation wall into the mould, and aligning the gasket along the corresponding region of the mould inner surface to create a seal between the mould inner surface and the separation wall and to define first and second half-spaces within the mould that are sealed from each other;
   f) perfecting the seal between the separation wall and the corresponding region of the mould inner surface by forcing compressed air through the chamber of the separation wall and against the gasket to compress the gasket against the corresponding region of the mould inner surface;
   g) slush moulding a layer of a first colored material within the first half-space, the layer of the first colored material only adhering to walls defining the first half-space;
   h) consolidating the layer of the first colored material;
   i) removing the gasket and the separation wall from the mould; and
   j) slush moulding a continuous layer of a second colored material within the mould, thereby producing the moulded two-colored article which includes the layer of the first colored material, the continuous layer of the second colored material, and a separation line between the layer of the first colored material and the continuous layer of the second colored material.

2. A method as claimed in claim 1, further comprising the step of selecting the first and second colored materials from the group consisting of thermoplastic, thermosetting and elastomeric resins, in powder form.

3. A method as claimed in claim 1, wherein step b) further includes moulding the gasket in the mould.

4. A method as claimed in claim 1, wherein step g) further includes coupling the mould to a tank having a pair of separate spaces, the first colored material being located in one of the pair of separate spaces.

* * * * *